United States Patent
Suzuki et al.

(10) Patent No.: US 11,987,091 B2
(45) Date of Patent: May 21, 2024

(54) CONTROL DEVICE AND SUSPENSION SYSTEM

(71) Applicant: HITACHI ASTEMO, LTD., Hitachinaka (JP)

(72) Inventors: Kota Suzuki, Hitachinaka (JP); Masato Tokuhara, Hitachinaka (JP); Yosuke Murakami, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 484 days.

(21) Appl. No.: 17/242,772

(22) Filed: Apr. 28, 2021

(65) Prior Publication Data

US 2021/0245569 A1 Aug. 12, 2021

Related U.S. Application Data

(63) Continuation of application No. PCT/JP2018/046909, filed on Dec. 20, 2018.

(51) Int. Cl.
*B60G 17/0165* (2006.01)
*B62K 25/04* (2006.01)

(52) U.S. Cl.
CPC .......... *B60G 17/0165* (2013.01); *B62K 25/04* (2013.01); *B60G 2300/12* (2013.01); *B60G 2400/0522* (2013.01); *B60G 2500/11* (2013.01); *B60G 2800/014* (2013.01); *B62K 2025/044* (2013.01)

(58) Field of Classification Search
CPC ............ B60G 17/0165; B60G 2300/12; B60G 2400/0522; B60G 2500/11; B60G 2800/014; B62K 25/04; B62K 2025/044
See application file for complete search history.

(56) References Cited

U.S. PATENT DOCUMENTS

| | | | | |
|---|---|---|---|---|
| 5,533,597 A | * | 7/1996 | Nezu | B60G 17/08 280/124.101 |
| 9,061,562 B2 | | 6/2015 | Hayakawa | |

(Continued)

FOREIGN PATENT DOCUMENTS

| | | |
|---|---|---|
| DE | 102014209164 A1 | 11/2015 |
| JP | 2011-529822 A | 12/2011 |

(Continued)

OTHER PUBLICATIONS

International Search Report dated Mar. 5, 2019 for the corresponding PCT International Application No. PCT/JP2018/046909.

(Continued)

*Primary Examiner* — Hussein Elchanti
*Assistant Examiner* — Kenneth M Dunne
(74) *Attorney, Agent, or Firm* — Leason Ellis LLP; Edward J. Ellis; Melvin C. Garner

(57) ABSTRACT

A control device controls a damping force of a damping device, which damps a force generated between a vehicle body of a two-wheeled vehicle and at least one of a front wheel and a rear wheel, by using an angular velocity of rotational movement in a front-rear direction of an unsprung part of the two-wheeled vehicle, which is generated due to a difference between a velocity in an up-down direction of the front wheel and a velocity in the up-down direction of the rear wheel.

14 Claims, 11 Drawing Sheets

AT THE TIME OF RIDING OVER CONVEX PORTION

AT THE TIME OF BRAKE OPERATION

(56) References Cited

U.S. PATENT DOCUMENTS

| | | | |
|---|---|---|---|
| 2009/0234537 A1* | 9/2009 | Tomida | B60G 17/08 |
| | | | 701/38 |
| 2011/0118941 A1* | 5/2011 | Linker | B62K 21/00 |
| | | | 701/42 |
| 2011/0153158 A1 | 6/2011 | Acocella | |
| 2015/0239317 A1 | 8/2015 | Kurita | |

FOREIGN PATENT DOCUMENTS

| | | | |
|---|---|---|---|
| JP | 2014-80184 A | 5/2014 | |
| JP | 5790237 B2 | 10/2015 | |
| JP | 2018-075903 A | 5/2018 | |
| WO | WO-2010022852 A1 * | 3/2010 | B62K 25/04 |

OTHER PUBLICATIONS

Extended European Search Report dated Jun. 30, 2022 for the corresponding European Patent Application No. 18943655.3, 8 pages.

* cited by examiner

CONTROL DEVICE AND SUSPENSION SYSTEM

CROSS REFERENCE TO RELATED APPLICATIONS

This application is a continuation of International Patent Application No. PCT/JP2018/046909 filed on Dec. 20, 2018, the content of which is incorporated herein by reference in its entirety.

FIELD OF THE INVENTION

The present invention relates to a control device and a suspension system.

BACKGROUND OF THE INVENTION

In the related art, there has been proposed a technology capable of improving riding comfort by using a damping device capable of changing a damping force.

For example, a control device disclosed in JP 2014-80184 A includes a pitching angular velocity detection unit that detects a pitching angular velocity of a vehicle body, a front-wheel side pressure detection unit that detects a pressure in a compression-side chamber of a front-wheel side damper, and a rear-wheel side pressure detection unit that detects a pressure in a compression-side chamber of a rear-wheel side damper. The control device controls pressures in the compression-side chambers of the front-wheel side damper and the rear-wheel side damper based on the pitching angular velocity and the pressures in the compression-side chambers of the front-wheel side damper and the rear-wheel side damper.

SUMMARY OF THE INVENTION

It is preferable to control the damping force so as to prevent decrease in the riding comfort, which is caused in accordance with a condition of a road surface. Meanwhile, it is important to prevent steering stability of a driver from being impaired by the control.

An object of the present invention is to provide a control device and the like capable of securing steering stability while preventing decrease in riding comfort.

Hereinafter, the present invention will be described. In the following description, reference signs in the accompanying drawings are appended in parentheses for ease of understanding of the present invention, but the present invention is not limited to the illustrated embodiment.

The present invention is a control device (100) that controls a damping force of a damping device (200), which damps a force generated between a vehicle body (10) of a two-wheeled vehicle (1) and at least one of a front wheel (2) and a rear wheel (3), by using an angular velocity ($\omega d$) of rotational movement in a front-rear direction of an unsprung part (4) of the two-wheeled vehicle (1), which is generated due to a difference between a velocity (Vdf) in an up-down direction of the front wheel (2) and a velocity (Vdr) in the up-down direction of the rear wheel (3).

Here, the damping force of the damping device (200) may be controlled so as to suppress the rotational movement in a direction of the angular velocity ($\omega d$).

Further, the present invention is a control device (100) that controls a damping force of a damping device (200), which damps a force generated between a vehicle body (10) and at least one of a front wheel (2) and a rear wheel (3), by using a first angular velocity ($\omega u$) that is an angular velocity of rotational movement in a front-rear direction of the vehicle body (10), which is generated due to a difference between a velocity (Vuf) in an up-down direction on a front wheel (2) side of the vehicle body (10) and a velocity (Vur) in the up-down direction on a rear wheel (3) side of the vehicle body (10), and a second angular velocity ($\omega d$) that is an angular velocity of rotational movement in the front-rear direction of an unsprung part (4) having the front wheel (2) and the rear wheel (3), which is generated due to a difference between a velocity (Vdf) in the up-down direction of the front wheel (2) and a velocity (Vdr) in the up-down direction of the rear wheel (3).

Here, the damping force of the damping device may be controlled so as to suppress the rotational movement in the direction of the first angular velocity ($\omega u$) in a first state where the direction of the first angular velocity ($\omega u$) and a direction of the second angular velocity ($\omega d$) are the same, and to make a suppression amount in the direction of the first angular velocity ($\omega u$) become smaller than a suppression amount of the first state in a second state where the direction of the first angular velocity ($\omega u$) and the direction of the second angular velocity ($\omega d$) are different.

In addition, there may be provided a reference unit (121) that sets a reference current (Ibf) serving as a reference in determining a target current (Itf) to be supplied to a control valve (240), which is provided in the damping device (200) and which increases the damping force as a current amount supplied is increased; a correction unit (122) that sets a correction current (Icf) for correcting the reference current (Ibf); and a target setting unit (123) that sets the target current (Itf) by adding the reference current (Ibf) and the correction current (Icf). The correction unit (122) may calculate the correction current (Icf) by multiplying a reference correction current (Icbf) serving as a reference in determining the correction current (Icf) by a composite coefficient (Kf) obtained by adding a first coefficient (Kuf) corresponding to the first angular velocity ($\omega u$) and a second coefficient (Kdf) corresponding to the second angular velocity ($\omega d$). Signs of the first coefficient (Kuf) and the second coefficient (Kdf) may be the same in the first state, and signs of the first coefficient (Kuf) and the second coefficient (Kdf) may be different in the second state.

In the second state, the first angular velocity ($\omega u$) may have a direction in which the rotational movement occurs such that the front wheel (2) side of the vehicle body (10) sinks and the rear wheel (3) side of the vehicle body (10) rises, and when the first coefficient (Kuf) has a sign to make the front wheel (2) side less likely to sink, the second coefficient (Kdf) may have a sign to make the front wheel (2) side likely to sink.

In the first state, the first angular velocity ($\omega u$) may have a direction in which the rotational movement occurs such that the front wheel (2) side of the vehicle body (10) sinks and the rear wheel (3) side of the vehicle body (10) rises, and when the first coefficient (Kuf) has a sign to make the front wheel (2) side less likely to sink, the second coefficient (Kdf) may have a sign to make the front wheel (2) side less likely to sink.

Further, the damping force of the damping device (200) may be controlled by further using a velocity (Vuf) in the up-down direction of the vehicle body (10).

Further, the present invention is a suspension system (20) including the above-described control device (100) and a suspension (21) whose damping force is controlled by the control device (100).

According to the present invention, a control device and the like capable of securing steering stability while preventing decrease in riding comfort can be provided.

DETAILED DESCRIPTION OF THE INVENTION

Hereinafter, embodiments of the present invention will be described in detail with reference to the accompanying drawings. The following embodiments are exemplary embodiments of the present invention, and the present invention is not limited to the following embodiments.

First Embodiment

Figure 1:
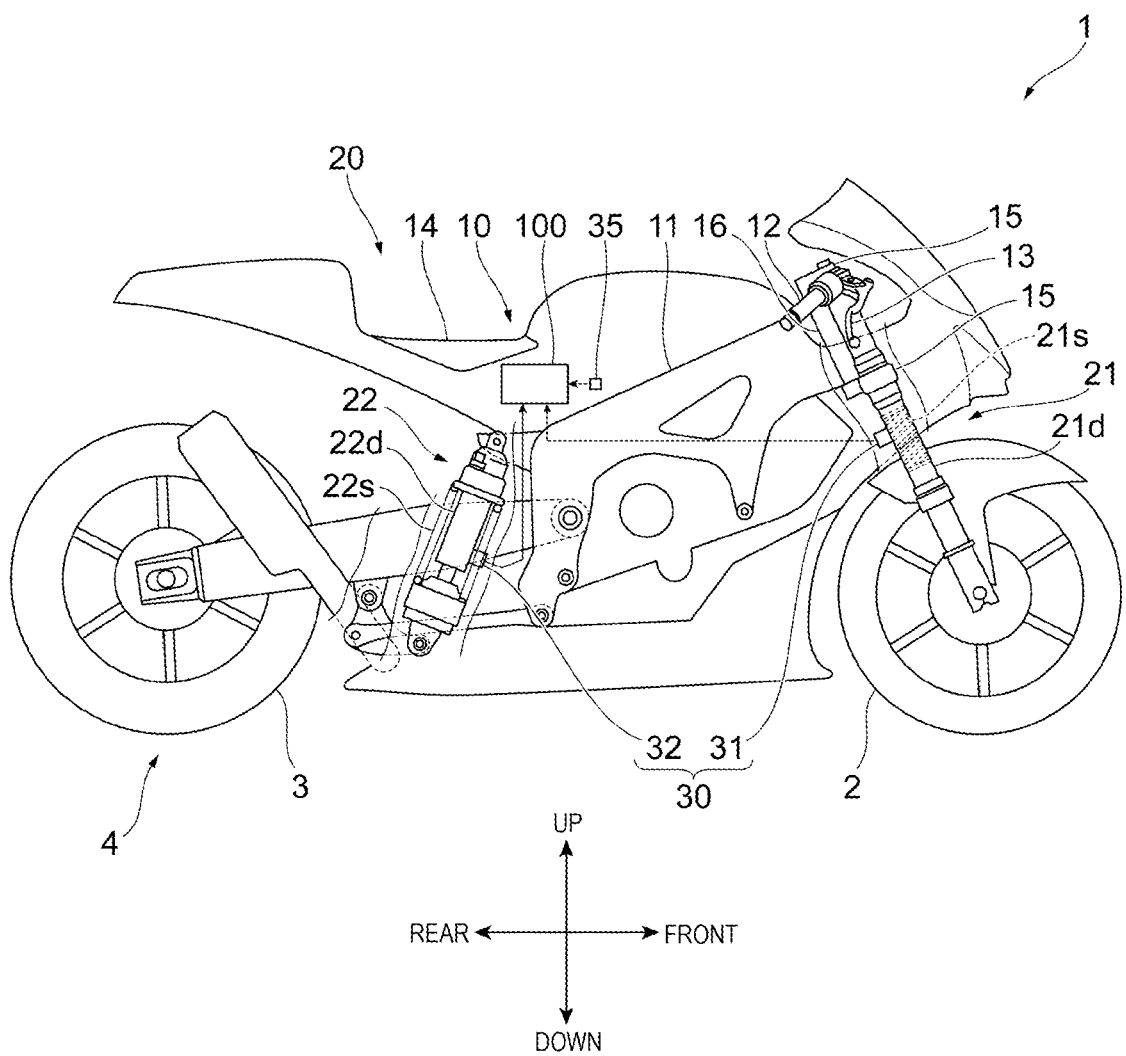
FIG. 1 is a diagram illustrating a schematic configuration of a motorcycle 1 according to a first embodiment.

FIG. 1 is a diagram illustrating a schematic configuration of a motorcycle 1 according to a first embodiment.

Figure 2:
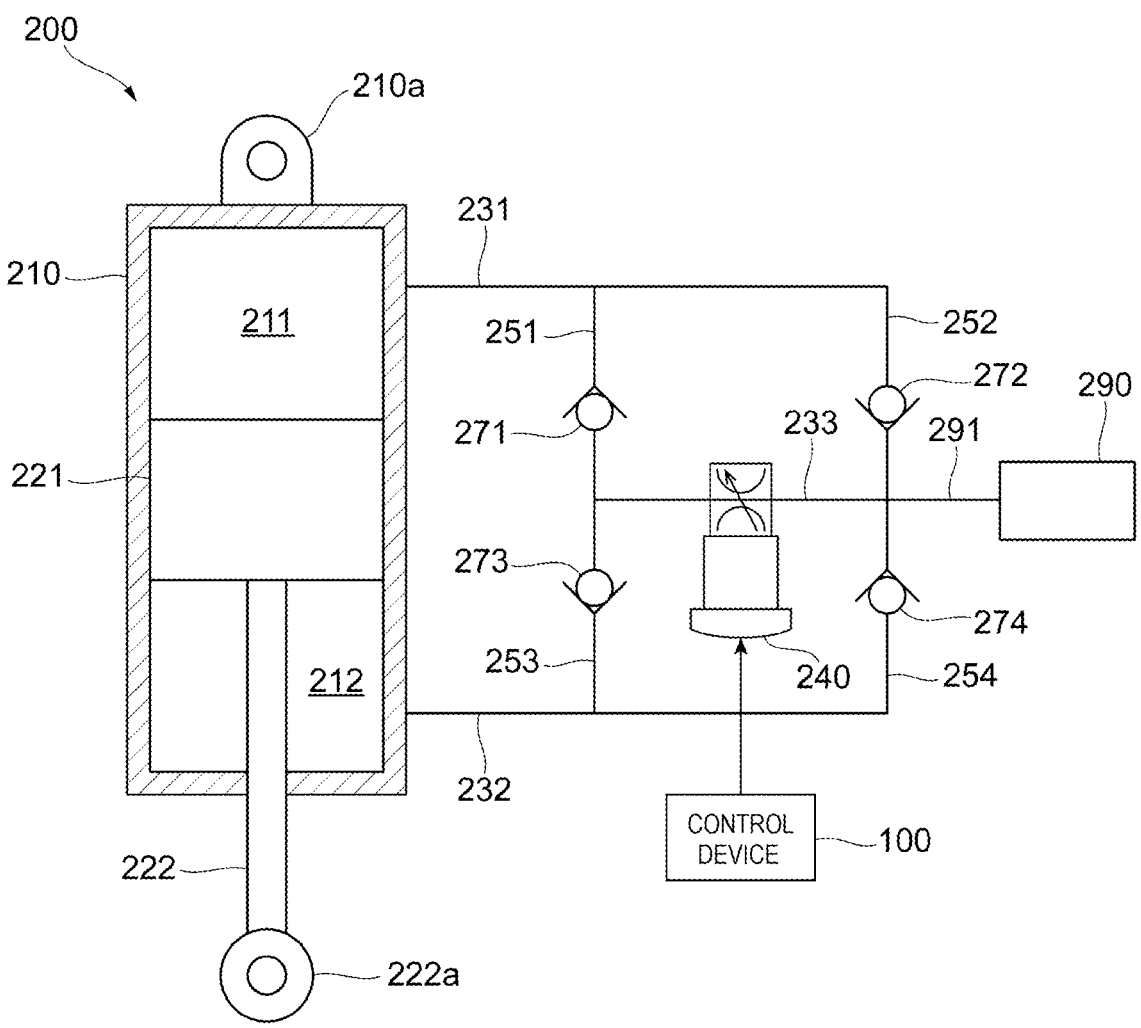
FIG. 2 is a diagram illustrating a schematic configuration of a damping device 200.

FIG. 2 is a diagram illustrating a schematic configuration of a damping device 200.

Figure 3:
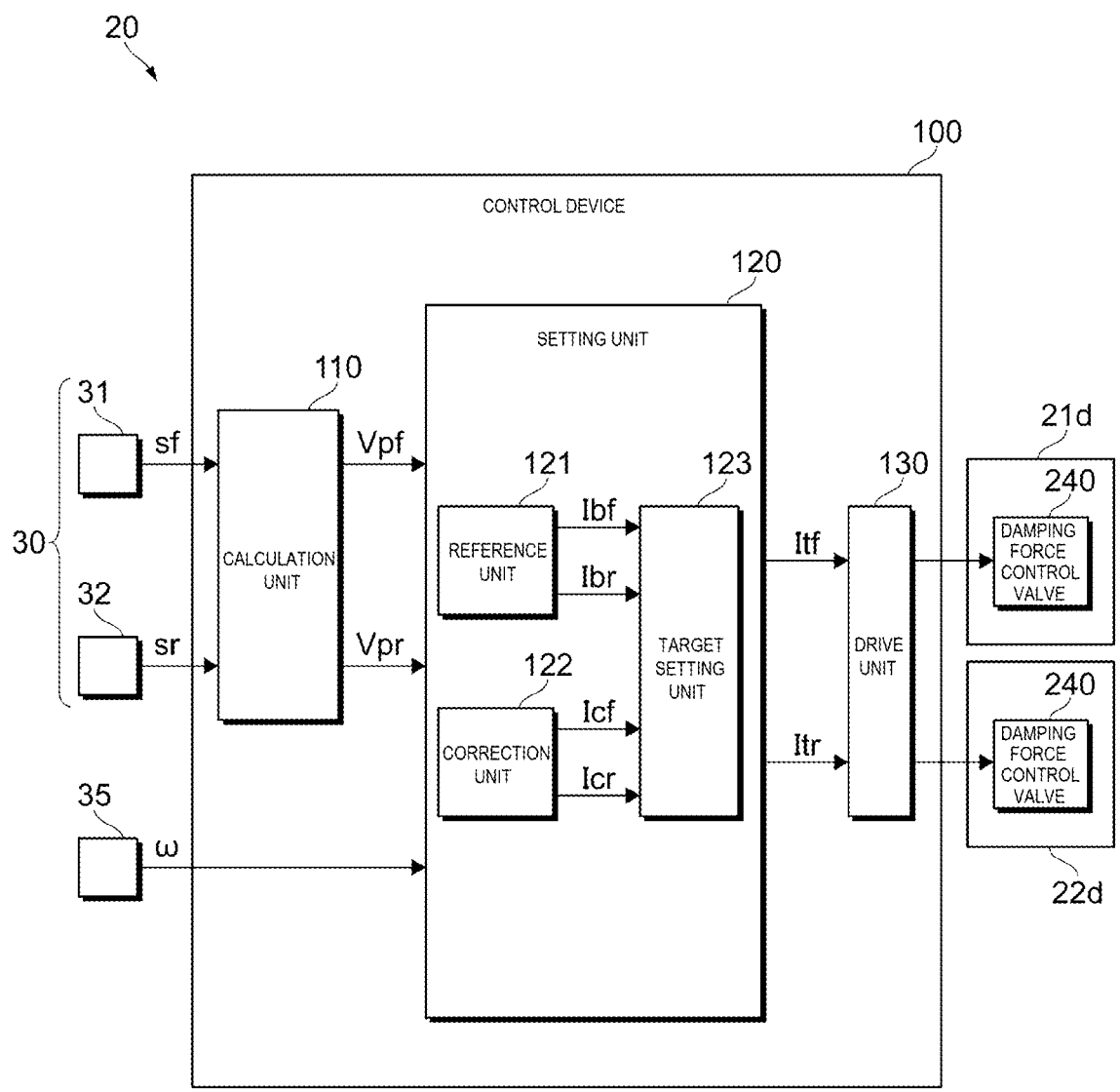
FIG. 3 is a diagram illustrating a schematic configuration of a control device 100.

FIG. 3 is a diagram illustrating a schematic configuration of a control device 100.

The motorcycle 1 includes a front wheel 2, which is a wheel on a front side, a rear wheel 3, which is a wheel on a rear side, and a vehicle body 10. The vehicle body 10 includes a vehicle body frame 11 forming a frame of the motorcycle 1, a handle 12, a brake lever 13, a seat 14, and the like.

The motorcycle 1 also includes a suspension 21 on a front wheel side, which couples the front wheel 2 and the vehicle body 10. The motorcycle 1 further includes two brackets 15 that holds two suspensions 21 arranged on the left and right sides of the front wheel 2, and a shaft 16 that is disposed between the two brackets 15. The shaft 16 is rotatably supported by the vehicle body frame 11. The suspension 21 includes a suspension spring 21s that absorbs impact applied to the front wheel 2 by a road surface or the like, and a damping device 21d that damps vibration of the suspension spring 21s.

The motorcycle 1 further includes a suspension 22 on a rear wheel side. The suspension 22 includes a suspension spring 22s that absorbs impact applied to the rear wheel 3 by a road surface or the like, and a damping device 22d that damps vibration of the suspension spring 22s. The damping device 22d damps a force generated between the rear wheel 3 and the vehicle body 10.

In the following description, the front wheel 2 and the rear wheel 3 may be collectively referred to as a "wheel". The suspension 21 on the front wheel side and the suspension 22 on the rear wheel side may be collectively referred to as a "suspension". The suspension spring 21s and the suspension spring 22s may be collectively referred to as a "spring". The damping device 21d and the damping device 22d may be collectively referred to as a "damping device 200". An assembly of components below the spring is referred to as an unsprung part 4. The unsprung part 4 includes the front wheel 2 and the rear wheel 3.

The motorcycle 1 receives output signals from a stroke sensor 31, which detects an amount of expansion and contraction of the suspension 21, and a stroke sensor 32 that detects an amount of expansion and contraction of the suspension 22. In the following description, the stroke sensor 31 and the stroke sensor 32 may be collectively referred to as a "stroke sensor 30".

The motorcycle 1 also includes a pitch rate sensor 35 that detects a pitch rate that is an angular velocity around a pitch axis passing through a center of gravity G of the vehicle body 10.

The motorcycle 1 includes the control device 100 that controls damping forces of the damping device 21d and the damping device 22d by using detection values of the stroke sensor 30 and the pitch rate sensor 35.

A suspension system 20 according to the present invention is a system including a suspension (suspension 21 and suspension 22) and the control device 100.

(Damping Device)

The damping device 200 includes a cylinder 210 filled with hydraulic oil, a piston 221, and a piston rod 222. An end portion 210a on one side (upper side in FIG. 2) of the cylinder 210 is coupled to the vehicle body 10. The piston rod 222 holds the piston 221 at an end portion thereof on one side, and is coupled to the wheel at an end portion 222a on the other side (lower side in FIG. 2).

Since the piston 221 is accommodated in the cylinder 210, the cylinder 210 is divided into a compression-side oil chamber 211 in which a pressure of the hydraulic oil rises in a compression stroke and an extension-side oil chamber 212 in which the pressure of the hydraulic oil rises in an extension stroke.

The damping device 200 includes a first oil passage 231 connected to the oil chamber 211 in the cylinder 210, and a second oil passage 232 connected to the oil chamber 212 in the cylinder 210. Further, the damping device 200 includes a third oil passage 233 provided between the first oil passage 231 and the second oil passage 232, and a damping force control valve 240 provided in the third oil passage 233. Further, the damping device 200 includes a first branch passage 251 that connects the first oil passage 231 and one end portion of the third oil passage 233, and a second branch passage 252 that connects the first oil passage 231 and the other end portion of the third oil passage 233. Further, the damping device 200 includes a third branch passage 253 that connects the second oil passage 232 and one end portion of the third oil passage 233, and a fourth branch passage 254 that connects the second oil passage 232 and the other end portion of the third oil passage 233.

Further, the damping device 200 includes a first check valve 271 provided in the first branch passage 251 and a second check valve 272 provided in the second branch passage 252. Further, the damping device 200 includes a third check valve 273 provided in the third branch passage 253 and a fourth check valve 274 provided in the fourth branch passage 254. Further, the damping device 200 includes a reservoir 290 that has functions of storing the hydraulic oil and supplying/discharging the hydraulic oil, and a reservoir passage 291 that connects the reservoir 290 and the other end portion of the third oil passage 233.

The damping force control valve 240 has a solenoid, and a pressure of the hydraulic oil passing through the valve can be controlled by controlling the amount of current supplied to the solenoid. The damping force control valve 240 according to the present embodiment increases the pressure of the hydraulic fluid passing through the valve as the amount of current supplied to the solenoid increases. The amount of current supplied to the solenoid is controlled by the control device 100.

When the piston 221 moves toward the oil chamber 211, an oil pressure in the oil chamber 211 increases. Further, the hydraulic oil in the oil chamber 211 flows toward the damping force control valve 240, via the first oil passage 231 and the first branch passage 251. The pressure of the hydraulic oil passing through the damping force control valve 240 is adjusted using a valve pressure of the damping force control valve 240, thereby adjusting a damping force on a compression side. The hydraulic oil that has passed through the damping force control valve 240 flows into the oil chamber 212, via the fourth branch passage 254 and the second oil passage 232.

On the other hand, when the piston 221 moves toward the oil chamber 212, an oil pressure in the oil chamber 212 increases. Further, the hydraulic oil in the oil chamber 212 flows toward the damping force control valve 240, via the second oil passage 232 and the third branch passage 253. The pressure of the hydraulic oil passing through the damping force control valve 240 is adjusted using a valve pressure of the damping force control valve 240, thereby adjusting a damping force on an extension side. The hydraulic oil that has passed through the damping force control valve 240 flows into the oil chamber 211, via the second branch passage 252 and the first oil passage 231.

(Control Device 100)

The control device 100 is an arithmetic and logical operation circuit including a CPU, a ROM, a RAM, a backup RAM, and the like.

The control device 100 receives a front-wheel side stroke signal sf, which is an output signal converted from a stroke amount of the suspension 21 detected by the stroke sensor 31. In addition, the control device 100 receives a rear-wheel side stroke signal sr, which is an output signal converted from a stroke amount of the suspension 22 detected by the stroke sensor 32. In addition, the control device 100 receives, from the pitch rate sensor 35, a rate signal ω corresponding to a pitch rate, and the like.

The control device 100 controls the damping force by controlling the amount of current supplied to the solenoid of the damping force control valve 240. Specifically, the control device 100 increases the amount of current supplied to the solenoid of the damping force control valve 240 when increasing the damping force, and reduces the amount of current supplied to the solenoid of the damping force control valve 240 when reducing the damping force.

The control device 100 includes a calculation unit 110 that calculates velocities Vpf and Vpr, which are velocities of change in the stroke amount, by using the stroke signals sf and sr from the stroke sensor 30. The control device 100 includes a setting unit 120 that sets target currents Itf and Itr to be supplied to the solenoid of the damping force control valve 240, and a drive unit 130 that drives the damping force control valve 240.

The calculation unit 110 calculates the velocity Vpf of the front-wheel side by calculating a change amount of the stroke amount of the suspension 21 per unit time. In addition, the calculation unit 110 calculates the velocity Vpr of the rear-wheel side by calculating a change amount of the stroke amount of the suspension 22 per unit time. The velocity Vpf and the velocity Vpr may be collectively referred to as a "velocity Vp". In the following description, a sign of the velocity Vp in an extension direction of the suspension is set to be positive, and a sign of the velocity Vp in a compression direction of the suspension is set to be negative.

The setting unit 120 will be described in detail later.

The drive unit 130 includes, for example, a field effect transistor (FET) serving as a switching element connected between a positive electrode side line of a power source and a coil of the solenoid of the damping force control valve 240.

More specifically, the drive unit 130 performs a switching operation on the transistor so that a target current to be supplied to the damping force control valve 240 of the damping device 21d becomes the target current Itf set by the setting unit 120. In addition, the drive unit 130 performs the switching operation on the transistor so that a target current to be supplied to the damping force control valve 240 of the damping device 22d becomes the target current Itr set by the setting unit 120.

(Setting Unit 120)

The setting unit 120 sets the front-wheel side target current Itf to be supplied to the solenoid of the damping force control valve 240 of the damping device 21d based on the velocity Vpf and the like calculated by the calculation unit 110. The setting unit 120 sets the rear-wheel side target current Itr to be supplied to the solenoid of the damping force control valve 240 of the damping device 22d based on the velocity Vpr and the like calculated by the calculation unit 110. Hereinafter, the target current Itf and the target current Itr may be collectively referred to as a "target current It".

The setting unit 120 includes a reference unit 121 that sets reference currents Ibf and Ibr that serve as references in setting the target currents Itf and Itr. Further, the setting unit 120 includes a correction unit 122 that sets correction currents Icf and Icr for correcting the reference currents Ibf and Ibr in accordance with a traveling state of the motorcycle 1.

Further, the setting unit 120 includes a target setting unit 123 that finally sets the target currents Itf and Itr, by adding the reference currents Ibf and Ibr set by the reference unit 121 and the correction currents Icf and Icr set by the correction unit 122.

Figure 4:
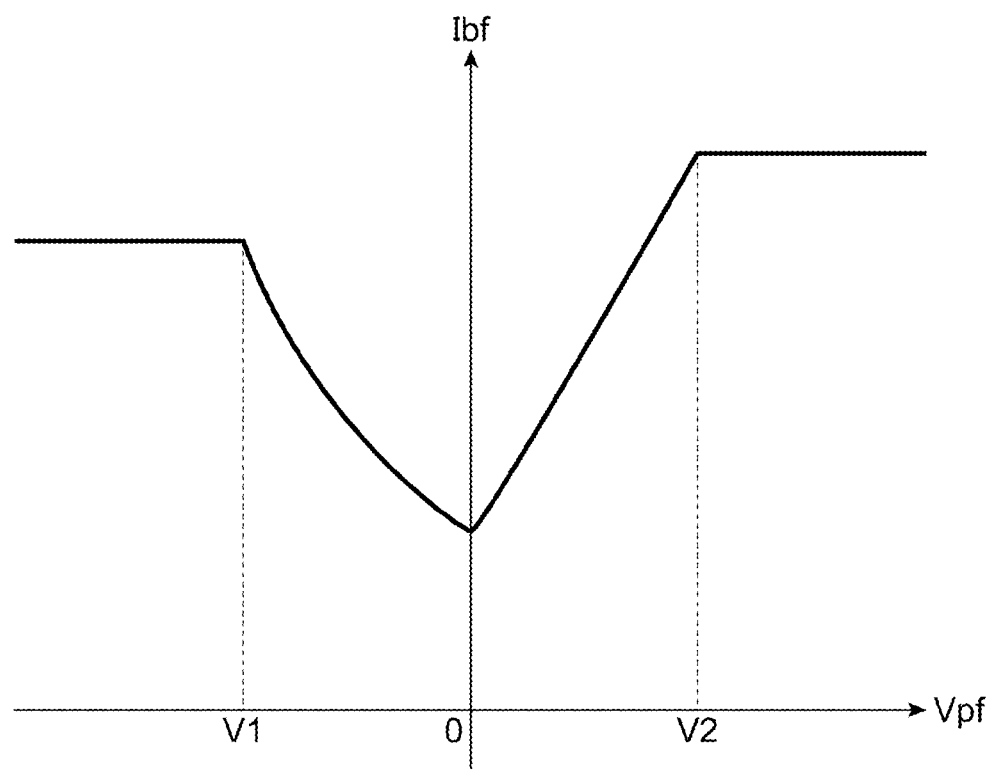
FIG. 4 is a schematic graph of a control map illustrating an example of a relationship between a reference current Ibf and a velocity Vpf.

FIG. 4 is a schematic graph of a control map illustrating an example of a relationship between the reference current Ibf and the velocity Vpf.

The reference unit 121 calculates a reference current Ibf corresponding to a velocity Vpf. For example, the reference unit 121 calculates the reference current Ibf by substituting the velocity Vpf into the control map shown in FIG. 4 illustrating the relationship between the reference current Ibf and the velocity Vpf, which is created in advance based on an experimental rule and is stored in the ROM.

In the control map illustrated in FIG. 4, in a case where the velocity Vpf is negative, when the velocity Vpf is equal to or greater than a first predetermined velocity V1, the current amount increases as the velocity Vpf decreases, and when the velocity Vpf is smaller than the first predetermined velocity V1, the current amount is set to be constant. In a case where the velocity Vpf is positive, when the velocity Vpf is equal to or smaller than a second predetermined velocity V2, the current amount increases as the velocity Vpf increases, and when the velocity Vpf is greater than the second predetermined velocity V2, the current amount is set to be constant.

Since a method of calculating the reference current Ibr by the reference unit 121 is the same as the method of calculating the reference current Ibf, a detailed description thereof will be omitted. In addition, since a control map illustrating an example of a relationship between the reference current Ibr and the velocity Vpf is the same as the control map illustrating an example of the relationship between the reference current Ibf and the velocity Vpf, a detailed description thereof will be omitted. Further, specific values of the first predetermined velocity V1, the second predetermined velocity V2, and the constant current amount may be the same or different.

Figure 5:
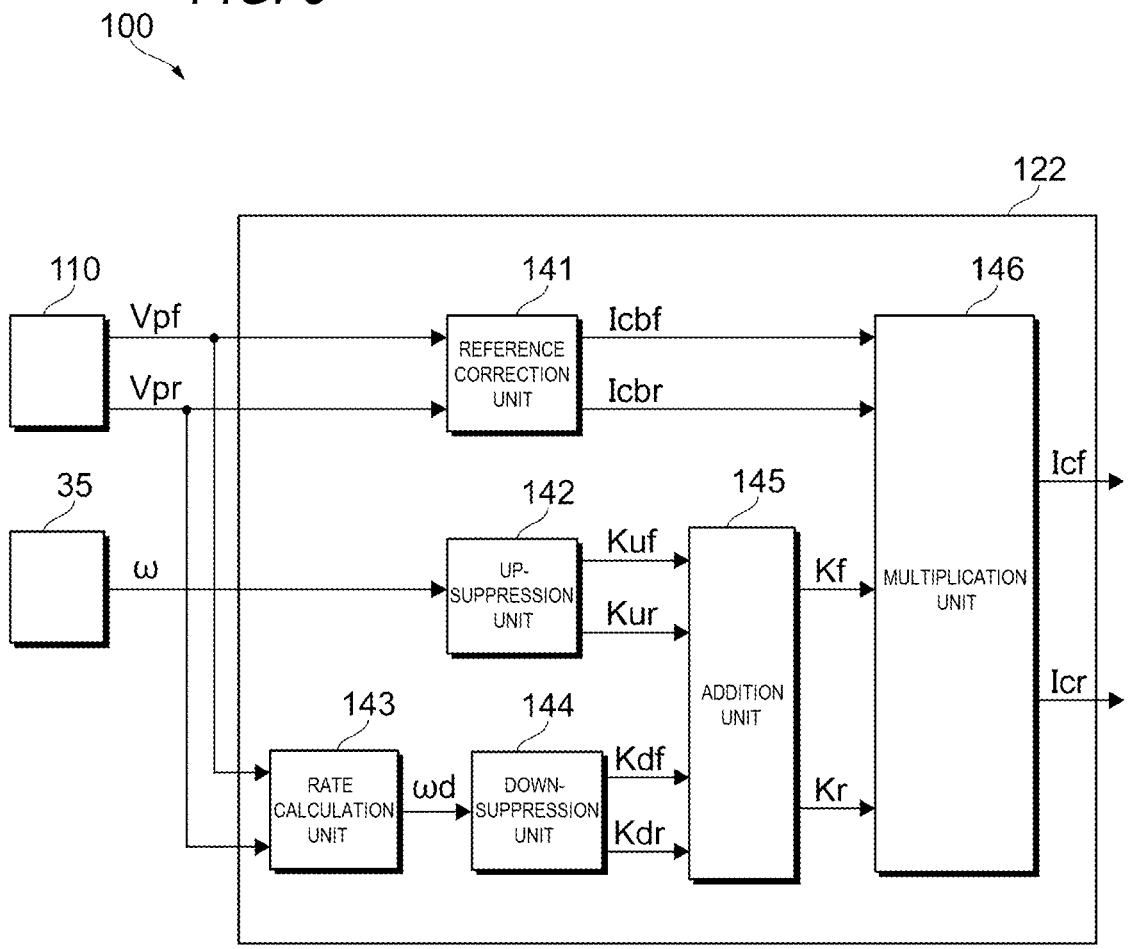
FIG. 5 is a schematic configuration diagram of a correction unit 122.

FIG. 5 is a schematic configuration diagram of the correction unit 122.

Figure 6:
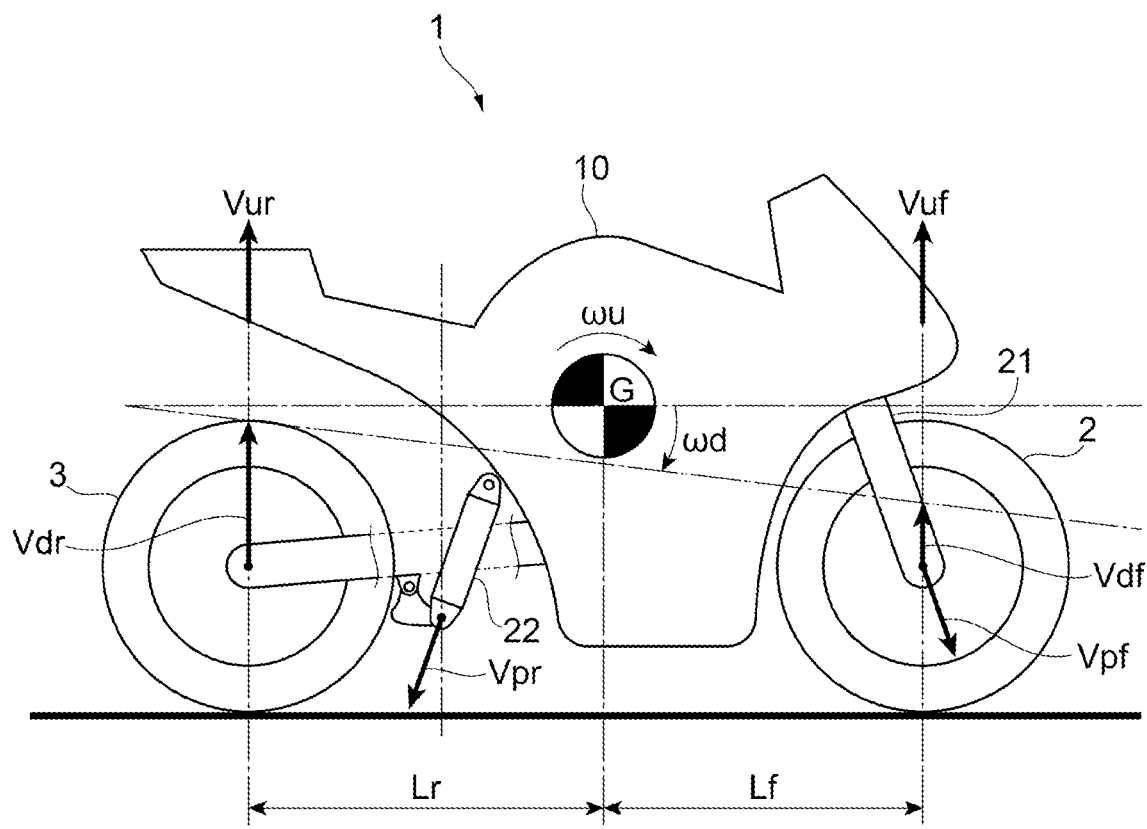
FIG. 6 is a schematic diagram illustrating vertical velocities Vuf and Vur, velocities Vpf and Vpr, vertical velocities Vdf and Vdr, an up rate ωu, and a down rate ωd.

FIG. 6 is a schematic diagram illustrating vertical velocities Vuf and Vur, the velocities Vpf and Vpr, vertical velocities Vdf and Vdr, an up rate ωu, and a down rate ωd.

The correction unit 122 includes a reference correction unit 141 that sets a reference correction current Icbf serving as a reference in setting the correction current Icf and that sets a reference correction current Icbr serving as a reference in setting the correction current Icr.

The correction unit 122 includes an up-suppression unit 142 that suppresses rotational movement of the vehicle body 10 in a front-rear direction, which is caused by a difference between the vertical velocity Vuf that is a velocity in an up-down direction generated in the vehicle body 10 on the front wheel 2 side and a vertical velocity Vur that is a velocity in the up-down direction generated in the vehicle body 10 on the rear wheel 3 side. The up-suppression unit 142 sets an up coefficient Kuf for correcting the reference correction current Icbf and an up coefficient Kur for correcting the reference correction current Icbr. A pitch rate of the rotational movement of the vehicle body 10 in the front-rear direction caused by the difference between the vertical velocity Vuf and the vertical velocity Vur is referred to as an "up rate ωu". The up rate ωu is detected by the pitch rate sensor 35.

Further, the correction unit 122 includes a rate calculation unit 143 that calculates a down rate ωd that is a pitch rate of rotational movement of the unsprung part 4 in the front-rear direction, which is caused by a difference between the vertical velocity Vdf that is a velocity in the up-down direction generated in the front wheel 2 and the vertical velocity Vdr that is a velocity in the up-down direction generated in the rear wheel 3.

The correction unit 122 includes a down-suppression unit 144 that suppresses rotational movement of the unsprung part 4 in the front-rear direction caused by the difference between the vertical velocity Vdf and the vertical velocity Vdr. The down-suppression unit 144 sets a down coefficient Kdf for correcting the reference correction current Icbf and a down coefficient Kdr for correcting the reference correction current Icbr.

In addition, the correction unit 122 includes an addition unit 145 that calculates composite coefficients Kf and Kr by adding the up coefficients Kuf and Kur set by the up-suppression unit 142 and the down coefficients Kdf and Kdr set by the down-suppression unit 144.

In addition, the correction unit 122 includes a multiplication unit 146 that calculates the correction currents Icf and Icr by multiplying the reference correction currents Icbf and Icbr set by the reference correction unit 141 and the composite coefficients Kf and Kr calculated by the addition unit 145.

(Rate Calculation Unit 143)

The rate calculation unit 143 calculates the down rate ωd by using the following equation (1) or the like.

$$\omega d = \tan^{-1}\{(Vdr - Vdf)/(Lr + Lf)\} \quad (1)$$

Here, Lf is a distance in the front-rear direction between a rotation center of the front wheel 2 and the center of gravity G of the vehicle body 10, and Lr is a distance in the front-rear direction between a rotation center of the rear wheel 3 and the center of gravity G of the vehicle body 10.

Further, the rate calculation unit 143 calculates the vertical velocity Vdf using the velocity Vpf. For example, the rate calculation unit 143 calculates the vertical velocity Vdf by substituting the velocity Vpf calculated by the calculation unit 110 into a control map illustrating a relationship between the vertical velocity Vdf and the velocity Vpf, which is created in advance based on an experimental rule and is stored in the ROM. As exemplification, in the control map illustrating the relationship between the vertical velocity Vdf and the velocity Vpf, it can be set as follows: the vertical velocity Vdf is 0 when the velocity Vpf is 0, the vertical velocity Vdf is smaller than 0 when the velocity Vpf is larger than 0, and the vertical velocity Vdf is larger than 0 when the velocity Vpf is smaller than 0.

In addition, the rate calculation unit 143 calculates the vertical velocity Vdr using the velocity Vpr. For example, the rate calculation unit 143 calculates the vertical velocity Vdr by substituting the velocity Vpr calculated by the calculation unit 110 into a control map illustrating a relationship between the vertical velocity Vdr and the velocity Vpr, which is created in advance based on an experimental rule and is stored in the ROM. As exemplification, in the control map illustrating the relationship between the vertical velocity Vdr and the velocity Vpr, it can be set as follows: the vertical velocity Vdr is 0 when the velocity Vpr is 0, the vertical velocity Vdr is smaller than 0 when the velocity Vpr is larger than 0, and the vertical velocity Vdr is larger than 0 when the velocity Vpr is smaller than 0.

(Reference Correction Unit 141)

The reference correction unit 141 sets the reference correction current Icbf to 0 when the velocity Vpf is 0, sets the reference correction current Icbf to a predetermined positive value when the velocity Vpf is larger than 0, and sets the reference correction current Icbf to a predetermined negative value when the velocity Vpf is smaller than 0.

Further, the reference correction unit 141 sets the reference correction current Icbr to 0 when the velocity Vpr is 0, sets the reference correction current Icbr to a predetermined positive value when the velocity Vpr is larger than 0, and sets the reference correction current Icbr to a predetermined negative value when the velocity Vpr is smaller than 0.

(Up-Suppression Unit 142)

In the following description, a sign of the rotational movement of the vehicle body 10 in the front-rear direction is set to be positive in a direction in which the front wheel 2 side sinks and the rear wheel 3 side rises, and is set to be negative in a direction in which the front wheel 2 side rises and the rear wheel 3 side sinks.

The up-suppression unit 142 sets the up coefficient Kuf to 0 when the up rate ωu is 0, sets the up coefficient Kuf to a predetermined negative value when the up rate ωu is larger than 0, and sets the up coefficient Kuf to a predetermined positive value when the up rate ωu is smaller than 0.

Further, the up-suppression unit 142 sets the up coefficient Kur to 0 when the up rate ωu is 0, sets the up coefficient Kur to a predetermined positive value when the up rate ωu is larger than 0, and sets the up coefficient Kur to a predetermined negative value when the up rate ωu is smaller than 0.

(Down-Suppression Unit 144)

The down-suppression unit 144 sets the down coefficient Kdf to 0 when the down rate ωd is 0, sets the down coefficient Kdf to a predetermined negative value when the down rate ωd is larger than 0, and sets the down coefficient Kdf to a predetermined positive value when the down rate ωd is smaller than 0.

Further, the down-suppression unit 144 sets the down coefficient Kdr to 0 when the down rate ωd is 0, sets the down coefficient Kdr to a predetermined positive value when the down rate ωd is larger than 0, and sets the down coefficient Kdr to a predetermined negative value when the down rate ωd is smaller than 0.

(Addition Unit 145)

The addition unit 145 calculates the composite coefficient Kf by adding the up coefficient Kuf and the down coefficient Kdf (Kf=Kuf+Kdf). Further, the addition unit 145 calculates the composite coefficient Kr by adding the up coefficient Kur and the down coefficient Kdr (Kr=Kur+Kdr).

(Multiplication Unit 146)

The multiplication unit 146 calculates the correction current Icf by multiplying the reference correction current Icbf by the composite coefficient Kf (Icf=Icbf×Kf). Further, the multiplication unit 146 calculates the correction current Icr by multiplying the reference correction current Icbr by the composite coefficient Kr (Icr=Icbf×Kr).

(Flowchart of Target Current Setting Processing)

Next, a procedure of target current setting processing performed by the setting unit 120 will be described using a flowchart.

Figure 7:
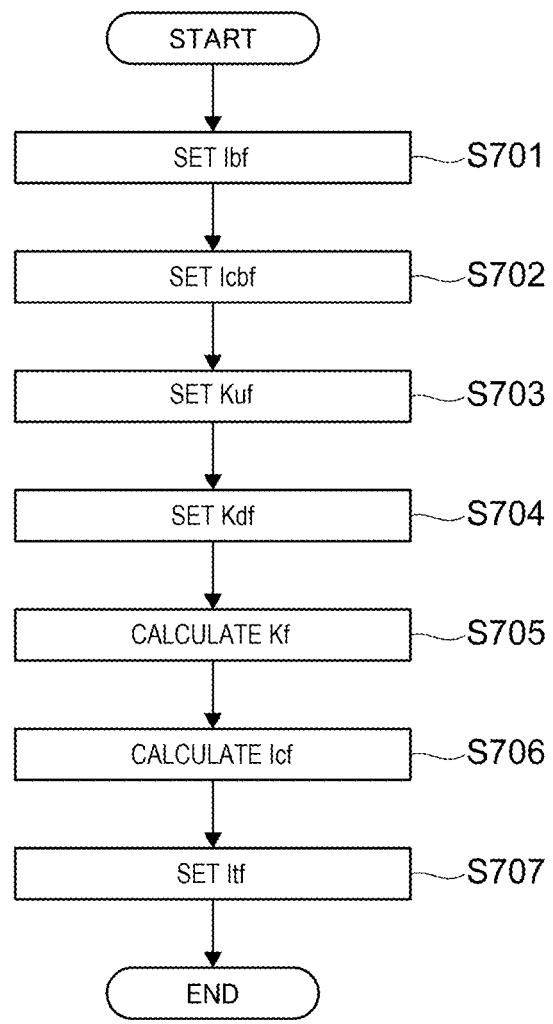
FIG. 7 is a flowchart illustrating a procedure of target current setting processing performed by a setting unit 120.

FIG. 7 is a flowchart illustrating the procedure of target current setting processing performed by the setting unit 120.

The setting unit 120 repeatedly executes the target current setting processing every predetermined period (for example, 1 millisecond). In the target current setting processing, the setting unit 120 sets the target current Itf and the target current Itr. Hereinafter, processing of setting the target current Itf by the setting unit 120 will be described. Since processing of setting the target current Itr by the setting unit 120 is the same as the processing of setting the target current Itf, a detailed description thereof will be omitted.

The setting unit 120 sets the reference current Ibf (step (hereinafter, also referred to as "S") 701). This is processing in which the reference unit 121 calculates the reference current Ibf using the velocity Vpf calculated by the calculation unit 110.

The setting unit 120 sets the reference correction current Icbf (S702). This is processing in which the reference correction unit 141 sets the reference correction current Icbf using the velocity Vpf calculated by the calculation unit 110.

The setting unit 120 sets the up coefficient Kuf (S703). This is processing in which the up-suppression unit 142 sets the up coefficient Kuf using the up rate (nu detected by the pitch rate sensor 35.

The setting unit 120 sets the down coefficient Kdf (S704). This is processing in which the down-suppression unit 144 sets the down coefficient Kdf using the down rate ωd calculated by the rate calculation unit 143.

The setting unit 120 calculates the composite coefficient Kf (S705). This is processing in which the addition unit 145 adds the up coefficient Kuf set in step S703 and the down coefficient Kdf set in step S704.

The setting unit 120 calculates the correction current Icf (S706). This is processing in which the multiplication unit 146 calculates the correction current Icf by multiplying the reference correction current Icbf set in step S702 by the composite coefficient Kf set in step S705.

Further, the setting unit 120 calculates the target current Itf (S707). This is processing in which the target setting unit 123 sets, as the target current Itf, a value obtained by adding the reference current Ibf set in step S701 and the correction current Icf calculated in step S706 (Itf=Ibf+Icf).

(Operations and Effects)

As described above, the target current setting processing is performed by the setting unit 120 to set the target current It, and the damping force of the damping device 200 is controlled, so that the operations are as follows. Hereinafter, a configuration in which the down-suppression unit 144 is not provided to the control device 100 according to the first embodiment is referred to as a "first comparative configuration", and the operations of the first embodiment will be described in comparison with the first comparative configuration.

Figure 8:
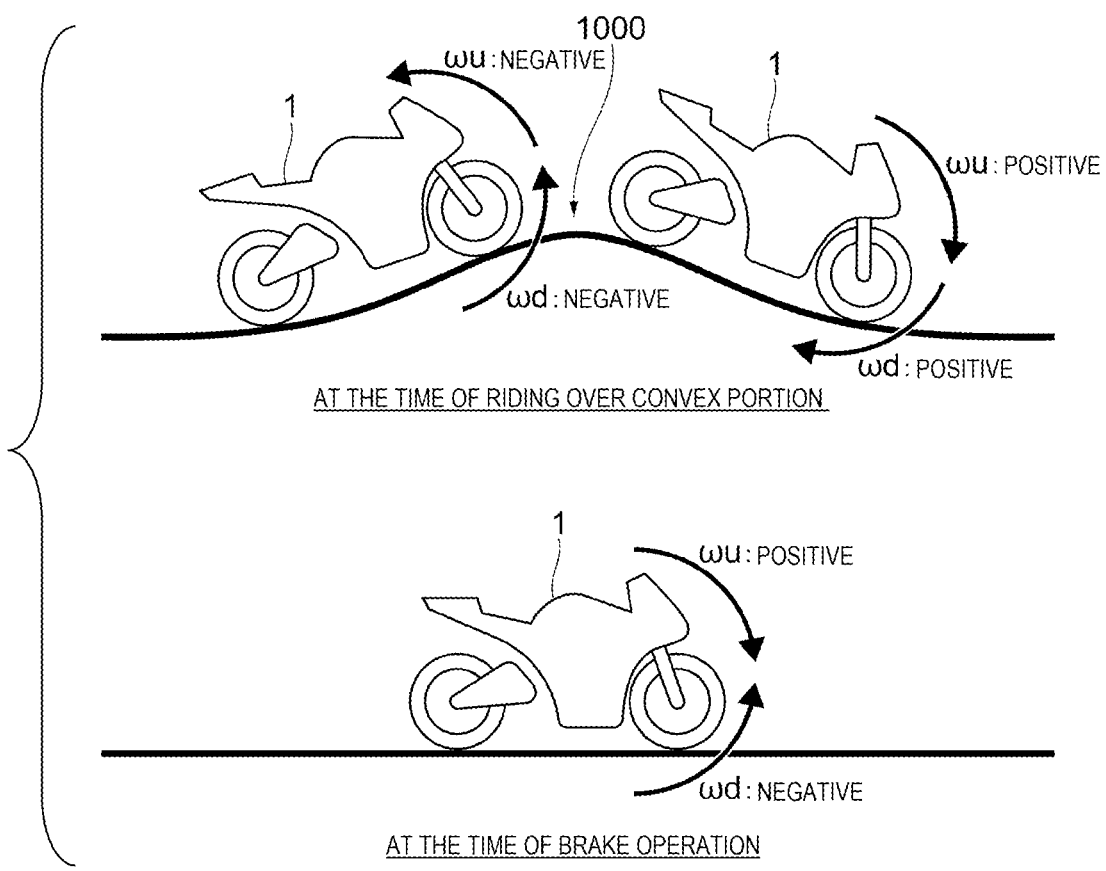
FIG. 8 is a diagram illustrating directions of the up rate ωu and the down rate ωd occurring in the motorcycle 1 when the motorcycle 1 travels on a road surface having a convex portion 1000 and when a brake operation is performed.

FIG. 8 is a diagram illustrating directions of the up rate ωu and the down rate ωd occurring in the motorcycle 1 when the motorcycle 1 travels on a road surface having a convex portion 1000 and when a brake operation is performed.

[Before Riding Over Convex Portion 1000]

For example, before the motorcycle 1 rides over the convex portion 1000 of the road surface, a negative up rate ωu and a negative down rate ωd are generated as shown in FIG. 8.

In this case, the up coefficient Kuf set by the up-suppression unit 142 and the down coefficient Kdf set by the down-suppression unit 144 are both positive on the front wheel 2 side of the motorcycle 1. Then, since the down coefficient Kdf is positive, the correction current Icf is increased as compared with that in the first comparative configuration when the suspension 21 is in the extension direction, and is reduced as compared with that in the first comparative configuration when the suspension 21 is in the compression direction. As a result, when the suspension 21 is in the extension direction, the damping force of the damping device 21d is larger than that in the first comparative configuration, and when the suspension 21 is in the compression direction, the damping force of the damping device 21d is smaller than that in the first comparative configuration.

On the other hand, since the up rate ωu and the down rate ωd are negative, the up coefficient Kur set by the up-suppression unit 142 and the down coefficient Kdr set by the down-suppression unit 144 are both negative on the rear wheel 3 side.

Then, since the down coefficient Kdr is negative, the correction current Icr is reduced as compared with that in the first comparative configuration when the suspension 22 is in the extension direction, and is increased as compared with that in the first comparative configuration when the suspension 22 is in the compression direction. As a result, when the suspension 22 is in the extension direction, the damping force of the damping device 22d is smaller than that in the first comparative configuration, and when the suspension 22 is in the compression direction, the damping force of the damping device 22d is larger than that in the first comparative configuration.

As a result, in the motorcycle 1, the suspension 21 is less likely to extend and the suspension 22 is less likely to contract, as compared with the first comparative configuration. In addition, in the motorcycle 1, the suspension 21 is likely to contract, and the suspension 22 is likely to extend, as compared with the first comparative configuration. Accordingly, in the motorcycle 1, a rotational movement in which the front wheel 2 side rises and the rear wheel 3 side sinks is suppressed as compared with the first comparative configuration. Therefore, since the motorcycle 1 can stabilize its posture as compared with the first comparative configuration, decrease in the riding comfort caused by the convex portion 1000 on the road surface is prevented.

[After Riding Over Convex Portion 1000]

After the motorcycle 1 has ridden over the convex portion 1000 of the road surface, a positive up rate ωu and a positive down rate ωd are generated as shown in FIG. 8.

In this case, the up coefficient Kuf set by the up-suppression unit 142 and the down coefficient Kdf set by the down-suppression unit 144 are both negative on the front wheel 2 side of the motorcycle 1. Then, since the down coefficient Kdf is negative, the correction current Icf is reduced as compared with that in the first comparative configuration when the suspension 21 is in the extension direction, and is increased as compared with that in the first comparative configuration when the suspension 21 is in the compression direction. As a result, when the suspension 21 is in the compression direction, the damping force of the damping device 21d is larger than that in the first comparative configuration, and when the suspension 21 is in the extension direction, the damping force of the damping device 21d is smaller than the first comparative configuration.

On the other hand, since the up rate ωu and the down rate ωd are positive, the up coefficient Kur set by the up-suppression unit 142 and the down coefficient Kdr set by the down-suppression unit 144 are both positive on the rear wheel 3 side. Then, since the down coefficient Kdr is positive, the correction current Icr is increased as compared with that in the first comparative configuration when the suspension 22 is in the extension direction, and is reduced as compared with that in the first comparative configuration when the suspension 22 is in the compression direction. As a result, when the suspension 22 is in the extension direction, the damping force of the damping device 22d is larger than that in the first comparative configuration, and when the suspension 22 is in the compression direction, the damping force of the damping device 22d is smaller than that in the first comparative configuration.

As a result, in the motorcycle 1, the suspension 21 is less likely to contract and the suspension 22 is less likely to extend, as compared with the first comparative configuration. In addition, in the motorcycle 1, the suspension 21 is likely to extend, and the suspension 22 is likely to contract, as compared with the first comparative configuration. Accordingly, in the motorcycle 1, a rotational movement in which the front wheel 2 side sinks and the rear wheel 3 side rises is suppressed, as compared with the first comparative configuration. Therefore, since the motorcycle 1 can stabilize its posture as compared with the first comparative configuration, decrease in the riding comfort caused by the convex portion 1000 on the road surface is prevented.

[Brake Operation]

When a brake operation in which the brake lever 13 is gripped is performed, a positive up rate ωu and a negative down rate ωd are generated as shown in FIG. 8.

In this case, on the front wheel 2 side of the motorcycle 1, the up coefficient Kuf set by the up-suppression unit 142 is negative, while the down coefficient Kdf set by the down-suppression unit 144 is positive. That is, the sign of the up coefficient Kuf set by the up-suppression unit 142 is opposite to the sign of the down coefficient Kdf set by the down-suppression unit 144. For example, when an absolute value of the up coefficient Kuf and an absolute value of the down coefficient Kdf are the same, the composite coefficient Kf obtained by adding the up coefficient Kuf and the down coefficient Kdf is 0. Therefore, an effect of the up coefficient Kuf is offset by the down coefficient Kdf.

On the other hand, on the rear wheel 3 side, the up coefficient Kur set by the up-suppression unit 142 is positive, while the down coefficient Kdr set by the down-suppression unit 144 is negative. That is, the sign of the up coefficient Kur set by the up-suppression unit 142 is opposite to the sign of the down coefficient Kdr set by the down-suppression unit 144. For example, when an absolute value of the up coefficient Kur and an absolute value of the down coefficient Kdr are the same, the composite coefficient Kr obtained by adding the up coefficient Kur and the down coefficient Kdr is 0. Therefore, an effect of the up coefficient Kur is offset by the down coefficient Kdr.

In the first comparative configuration, since the up coefficient Kuf is negative and the up coefficient Kur is positive, the suspension 21 is less likely to contract and the suspension 22 is less likely to extend. In contrast, in the motorcycle 1 according to the first embodiment, since the effect of the up coefficient Kuf is offset by the down coefficient Kdf, the suspension 21 easily contracts as compared with the first comparative configuration. In the motorcycle 1 according to the first embodiment, since the effect of the up coefficient Kur is offset by the down coefficient Kdr, the suspension 22 easily extends as compared with the first comparative configuration. That is, in the motorcycle 1, when the brake operation is performed, the front wheel 2 side sinks more easily and the rear wheel 3 side rises more easily than in the first comparative configuration. As a result, according to the motorcycle 1, since a caster angle is smaller than in the first comparative configuration and the handle 12 can be quickly rotated, the handle 12 is easily operated. Therefore, handling performance of the motorcycle 1 is improved as compared with that of the first comparative configuration.

As described above, according to the motorcycle 1 including the up-suppression unit 142 and the down-suppression unit 144, when the rotational movement in the front-rear direction occurs in accordance with a condition of the road surface in cases such as one where the motorcycle 1 travels on a road surface having unevenness, the effect for having the up-suppression unit 142 is increased and the rotational movement is suppressed. Therefore, for example, since the posture is stabilized when the motorcycle 1 travels on the road surface having unevenness, decrease of the riding comfort caused by the unevenness of the road surface is prevented. On the other hand, when the rotational movement in the front-rear direction occurs in response to an operation by a driver in cases such as one where a brake operation is performed, a problem that a feeling of contact of the wheels with respect to the road surface is weakened due to provision of the up-suppression unit 142 is eliminated. Therefore, for example, when the brake operation is performed, a feeling of contact of the front wheel 2 with respect to the road surface is increased, and the handling performance is improved. That is, even if a function of suppressing rotational movement in the front-rear direction is provided, it is possible to secure the steering stability.

In the embodiment described above, the up-suppression unit 142 sets the up coefficients Kuf and Kur, and the down-suppression unit 144 sets the down coefficients Kdf and Kdr. Therefore, by changing the up coefficients Kuf and Kur and the down coefficients Kdf and Kdr depending on the type of the vehicle, setting to match each of a plurality of types of vehicles can be easily and finely realized.

Further, values of the up coefficients Kuf and Kur with respect to a value of the up rate ωu, and values of the down coefficients Kdf and Kdr with respect to a value of the down rate ωd may be switched according to a state of the motorcycle 1. For example, the switching may be performed according to a vehicle speed of the motorcycle 1. Further, the switching may be performed in accordance with a control mode selected by the driver. As the control mode, a standard mode in which an urban area is assumed, a sport mode in which a winding load is assumed, a highway mode in which a high speed road or the like is assumed, a comfort mode in which a state where the riding comfort is prioritized during traveling, and the like are considered.

In the above description, a mode is exemplified. In the mode, the up-suppression unit 142 sets a negative up coefficient Kuf when the up rate ωu is positive and sets a positive up coefficient Kur when the up rate ωu is negative, and the addition unit 145 calculates the composite coefficient Kf by adding a down coefficient Kdf to the up coefficient Kuf. Note that the present invention is not limited to this mode. The up-suppression unit 142 may set the positive up coefficient Kuf when the up rate ωu is positive and set the negative up coefficient Kuf when the up rate ωu is negative. When calculating the composite coefficient Kr, the addition unit 145 may add the down coefficient Kdf to a value obtained by inverting the sign of the up coefficient Kuf set by the up-suppression unit 142.

In the above description, a mode is exemplified. In the mode, the down-suppression unit 144 sets a negative down coefficient Kdf when the down rate ωd is positive and sets a positive down coefficient Kdf when the down rate ωd is negative, and the addition unit 145 calculates the composite coefficient Kf by adding an up coefficient Kuf to the down coefficient Kdf. Note that the present invention is not limited to this mode. The down-suppression unit 144 may set the positive down coefficient Kdf when the down rate ωd is positive and set the negative down coefficient Kdf when the down rate ωd is negative. When calculating the composite coefficient Kr, the addition unit 145 may add the up coefficient Kuf to a value obtained by inverting the sign of the down coefficient Kdf set by the down-suppression unit 144.

In the embodiment described above, the correction unit 122 sets the correction current Icf for correcting the damping force of the damping device 21d and the correction current Icr for correcting the damping force of the damping device 22d, but the present invention is not limited thereto. The correction unit 122 may set only the correction current of one of the damping devices to correct one damping device, the damping device 21d or the damping device 22d.

Second Embodiment

Figure 9:
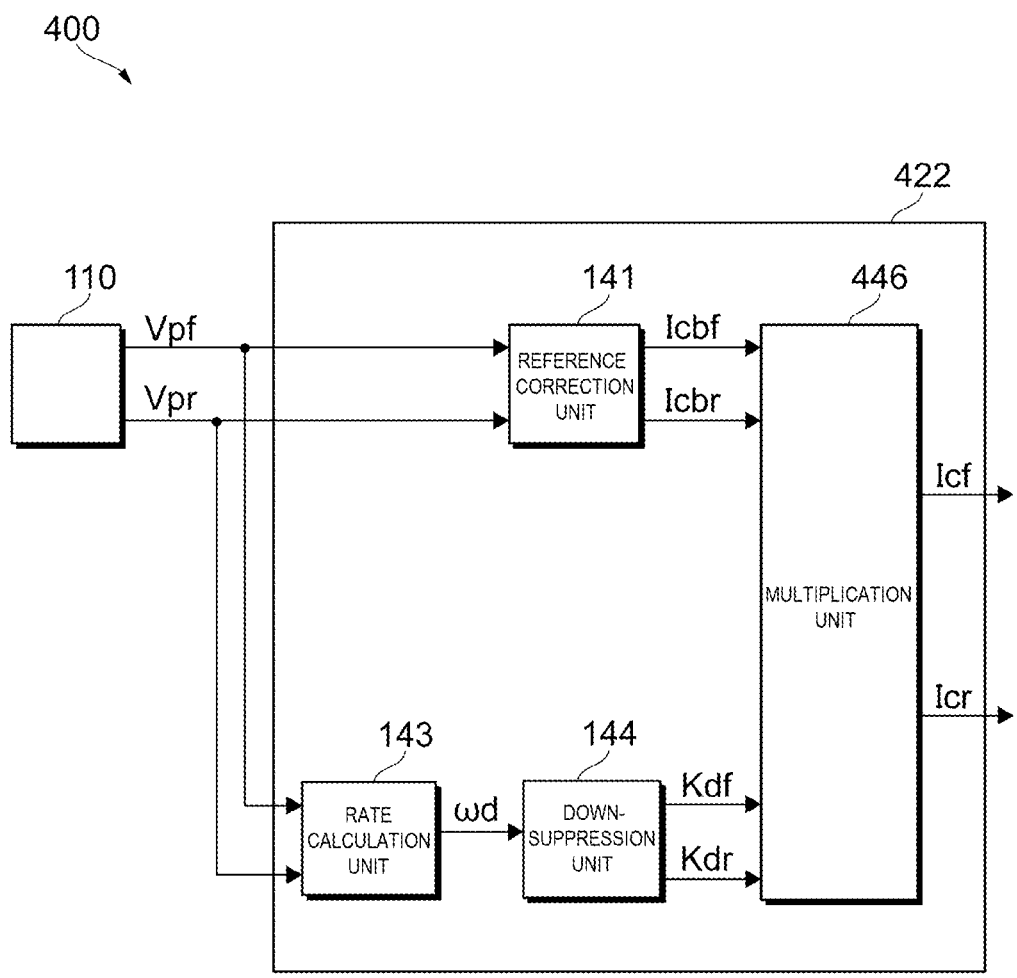
FIG. 9 is a schematic configuration diagram of a correction unit 422 of a motorcycle 400 according to a second embodiment.

FIG. 9 is a schematic configuration diagram of a correction unit 422 of a motorcycle 400 according to a second embodiment.

The motorcycle 400 according to the second embodiment differs from the motorcycle 1 according to the first embodiment in the correction unit 422 equivalent to the correction unit 122. The correction unit 422 differs from the correction unit 122 in not being provided with the up-suppression unit 142 and the addition unit 145, and in a method of calculating the correction currents Icf and Icr by a multiplication unit 446 equivalent to the multiplication unit 146. Hereinafter, differences from the motorcycle 1 will be described. Objects having the same function are denoted by the same reference sign in the motorcycle 1 and the motorcycle 400, and a detailed description thereof will be omitted.

The multiplication unit 446 calculates the correction current Icf by multiplying the reference correction current Icbf set by the reference correction unit 141 by the down coefficient Kdf set by the down-suppression unit 144 (Icf=Icbf×Kdf). Further, the multiplication unit 446 calculates the correction current Icr by multiplying the reference correction current Icbr set by the reference correction unit 141 by the down coefficient Kdr set by the down-suppression unit 144 (Icr=Icbr×Kdr).

(Operations and Effects)

Hereinafter, a configuration in which the down-suppression unit 144 is not provided to the motorcycle 400 according to the second embodiment is referred to as a "second comparative configuration", and operations of the second embodiment will be described in comparison with the second comparative configuration.

[Before Riding Over Convex Portion 1000]

Before the motorcycle 400 rides over the convex portion 1000 of the road surface, a negative down rate ωd is generated.

In this case, on a front wheel 2 side of the motorcycle 400, the down coefficient Kdf set by the down-suppression unit 144 is positive. Then, since the down coefficient Kdf is positive, the correction current Icf is increased as compared with that in the second comparative configuration when the suspension 21 is in an extension direction, and is reduced as compared with that in the second comparative configuration when the suspension 21 is in a compression direction. As a result, when the suspension 21 is in the extension direction, a damping force of the damping device 21d is larger than that in the second comparative configuration, and when the suspension 21 is in the compression direction, the damping force of the damping device 21d is smaller than that in the second comparative configuration.

On the other hand, on a rear wheel 3 side, the down coefficient Kdr set by the down-suppression unit 144 is negative. Then, since the down coefficient Kdr is negative, the correction current Icr is reduced as compared with that in the second comparative configuration when the suspension 22 is in an extension direction, and is increased as compared with that in the second comparative configuration when the suspension 22 is in a compression direction. As a result, when the suspension 22 is in the extension direction, a damping force of the damping device 22d is smaller than that in the second comparative configuration, and when the suspension 22 is in the compression direction, the damping force of the damping device 22d is larger than that in the second comparative configuration.

As a result, in the motorcycle 400, the suspension 21 is less likely to extend and the suspension 22 is less likely to contract, as compared with the second comparative configuration. In addition, in the motorcycle 400, the suspension 21 is likely to contract and the suspension 22 is likely to extend, as compared with the second comparative configuration. Accordingly, in the motorcycle 400, a rotational movement in which the front wheel 2 side rises and the rear wheel 3 side sinks is suppressed as compared with the second comparative configuration. Therefore, the motorcycle 400 can stabilize its posture as compared with the second comparative configuration.

[After Riding Over Convex Portion 1000]

After the motorcycle 400 has moved over the convex portion 1000 of the road surface, a positive down rate ωd is generated.

In this case, on the front wheel 2 side of the motorcycle 400, the down coefficient Kdf set by the down-suppression unit 144 is negative. Then, since the down coefficient Kdf is negative, the correction current Icf is reduced as compared with that in the second comparative configuration when the suspension 21 is in the extension direction, and is increased as compared with that in the second comparative configuration when the suspension 21 is in the compression direction. As a result, when the suspension 21 is in the compression direction, the damping force of the damping device 21d is larger than that in the second comparative configuration, and when the suspension 21 is in the extension direction, the damping force of the damping device 21d is smaller than that in the second comparative configuration.

On the other hand, on the rear wheel 3 side, the down coefficient Kdr set by the down-suppression unit 144 is positive. Then, since the down coefficient Kdr is positive, the correction current Icr is increased as compared with that in the second comparative configuration when the suspension 22 is in the extension direction, and is reduced as compared with that in the second comparative configuration when the suspension 22 is in the compression direction. As a result, when the suspension 22 is in the extension direction, the damping force of the damping device 22d is larger than that in the second comparative configuration, and when the suspension 22 is in the compression direction, the damping force of the damping device 22d is smaller than that in the second comparative configuration.

As a result, in the motorcycle 400, the suspension 21 is less likely to contract and the suspension 22 is less likely to extend, as compared with the second comparative configuration. In addition, in the motorcycle 400, the suspension 21 is likely to extend and the suspension 22 is likely to contract, as compared with the second comparative configuration. Accordingly, in the motorcycle 400, a rotational movement in which the front wheel 2 side sinks and the rear wheel 3 side rises is suppressed, as compared with the second comparative configuration. Therefore, the motorcycle 400 can stabilize its posture as compared with the second comparative configuration.

[Brake Operation]

When a brake operation in which the brake lever 13 is gripped is performed, a negative down rate ωd is generated.

In this case, on the front wheel 2 side of the motorcycle 1, the down coefficient Kdf set by the down-suppression unit 144 is positive. Then, since the down coefficient Kdf is positive, the correction current Icf is increased as compared with that in the second comparative configuration when the suspension 21 is in the extension direction, and is reduced as compared with that in the second comparative configuration when the suspension 21 is in the compression direction. As a result, when the suspension 21 is in the extension direction, the damping force of the damping device 21d is larger than that in the second comparative configuration, and when the suspension 21 is in the compression direction, the damping force of the damping device 21d is smaller than that in the second comparative configuration.

On the other hand, on the rear wheel 3 side, the down coefficient Kdr set by the down-suppression unit 144 is negative. Then, since the down coefficient Kdr is negative, the correction current Icr is reduced as compared with that in the second comparative configuration when the suspension 22 is in the extension direction, and is increased as compared with that in the second comparative configuration when the suspension 22 is in the compression direction. As a result, when the suspension 22 is in the extension direction, the damping force of the damping device 22d is smaller than that in the second comparative configuration, and when the suspension 22 is in the compression direction, the damping force of the damping device 22d is larger than that in the second comparative configuration.

As a result, in the motorcycle 400, the suspension 21 is likely to contract and the suspension 22 is likely to extend, as compared with the second comparative configuration. In the motorcycle 400, the suspension 21 is less likely to extend and the suspension 22 is less likely to contract, as compared with the second comparative configuration. Accordingly, in the motorcycle 400, the front wheel 2 side is likely to sink and the rear wheel 3 side is likely to rise, as compared with the second comparative configuration. As a result, according to the motorcycle 400, a caster angle is smaller than in the second comparative configuration, and the handle 12 is easily operated. Therefore, handling performance of the motorcycle 400 is improved as compared with that of the second comparative configuration.

As described above, according to the motorcycle 400 including the down-suppression unit 144, when the rotational movement in the front-rear direction occurs in accordance with a condition of the road surface in cases such as one where the motorcycle 400 travels on a road surface having unevenness, the rotational movement is suppressed. Therefore, for example, when the motorcycle 400 travels on the road surface having unevenness, the posture thereof is stabilized. On the other hand, when a rotational movement in the front-rear direction occurs in response to an operation of the driver in cases such as one where a brake operation is performed, a feeling of contact of the wheels with respect to the road surface is enhanced. Therefore, for example, when the brake operation is performed, the handle 12 is easily operated, and the handling performance is improved. That is, even if a function of suppressing rotational movement in the front-rear direction is provided, it is possible to secure the steering stability.

Figure 10:
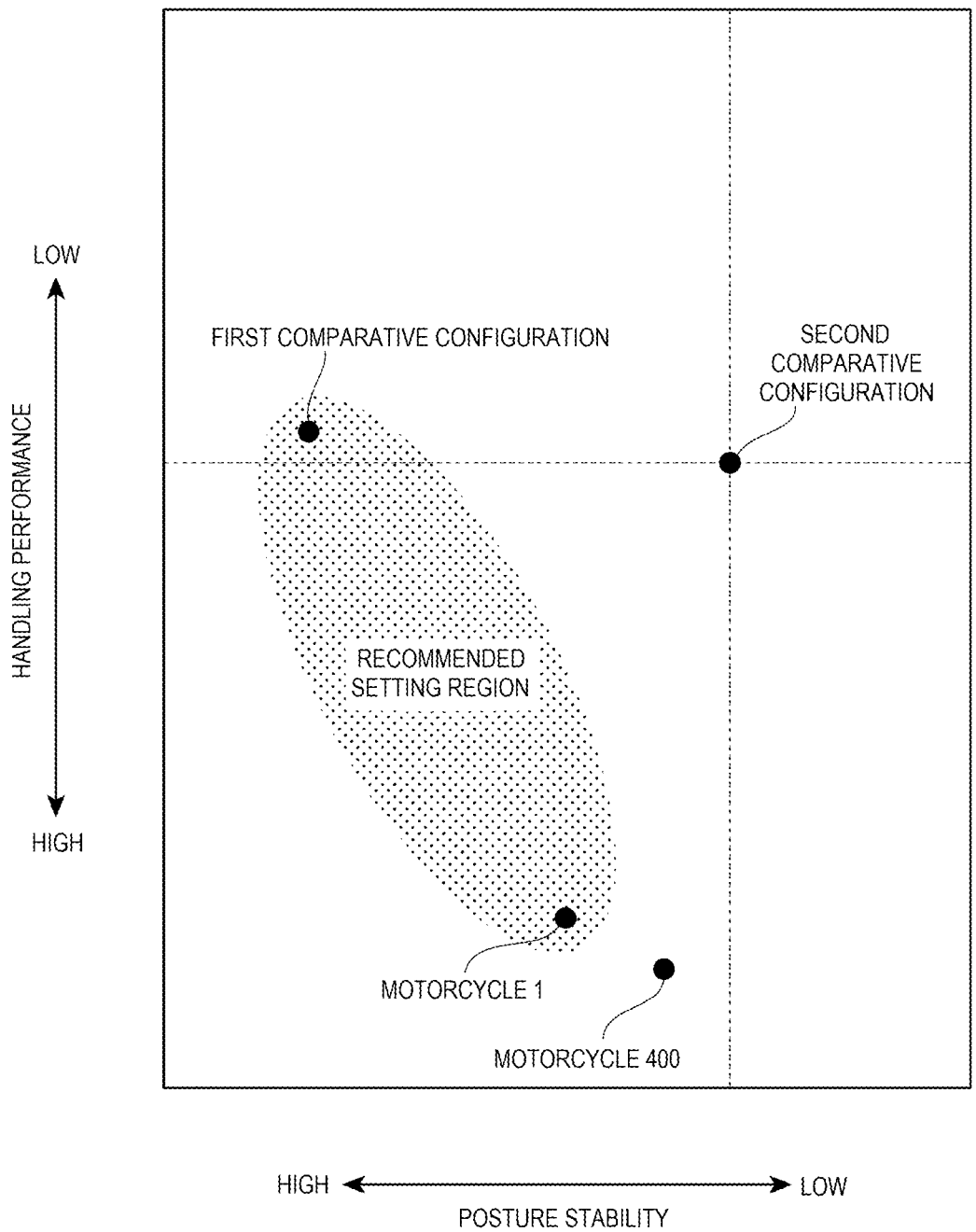
FIG. 10 is a graph in which the motorcycle 1, the motorcycle 400, a first comparative configuration, and a second comparative configuration are compared with each other for posture stability of a vehicle body 10 thereof and handling performance.

FIG. 10 is a graph in which the motorcycle 1, the motorcycle 400, the first comparative configuration, and the second comparative configuration are compared with each other for posture stability of the vehicle body 10 and the handling performance. In FIG. 10, the posture stability of the vehicle body 10 is shown on a horizontal axis and the handling performance is shown on a vertical axis.

When the posture stability and the handling performance of the second comparative configuration, which is not provided with either the up-suppression unit 142 or the down-suppression unit 144, are taken as references, an elliptical region indicated by a dot pattern in FIG. 10 is a recommended setting region recommended for setting the damping force of the damping device 200 of a certain type, including a region where handling performance and posture stability are higher than in the second comparative configuration and a region where posture stability is higher but handling performance is lower than in the second comparative configuration.

In the first comparative configuration in which the up-suppression unit 142 is provided but the down-suppression unit 144 is not provided, the posture stability tends to be higher and the handling performance tends to be lower than in the second comparative configuration. However, by appropriately adjusting the up coefficients Kuf and Kur, setting within the recommended setting region is possible.

In the motorcycle 1 provided with both the up-suppression unit 142 and the down-suppression unit 144, the posture stability and the handling performance both tend to be higher than in the second comparative configuration. Further, by setting the up coefficients Kuf and Kur and the down coefficients Kdf and Kdr, setting within the recommended setting region is possible. According to the motorcycle 1, by adjusting the up coefficients Kuf and Kur and the down coefficients Kdf and Kdr, an arbitrary setting within the recommended setting region is possible.

In the motorcycle 400 provided with the down-suppression unit 144 and not provided with the up-suppression unit 142, the posture stability and the handling performance both tend to be higher than in the second comparative configuration. As illustrated in FIG. 10, the elliptical region indicated by the dot pattern includes the first comparative configuration whose posture stability tends to be higher and whose handling performance tends to be lower than in the second comparative configuration, and the motorcycle 1 whose posture stability and handling performance tend to be higher than in the second comparative configuration.

Third Embodiment

Figure 11:
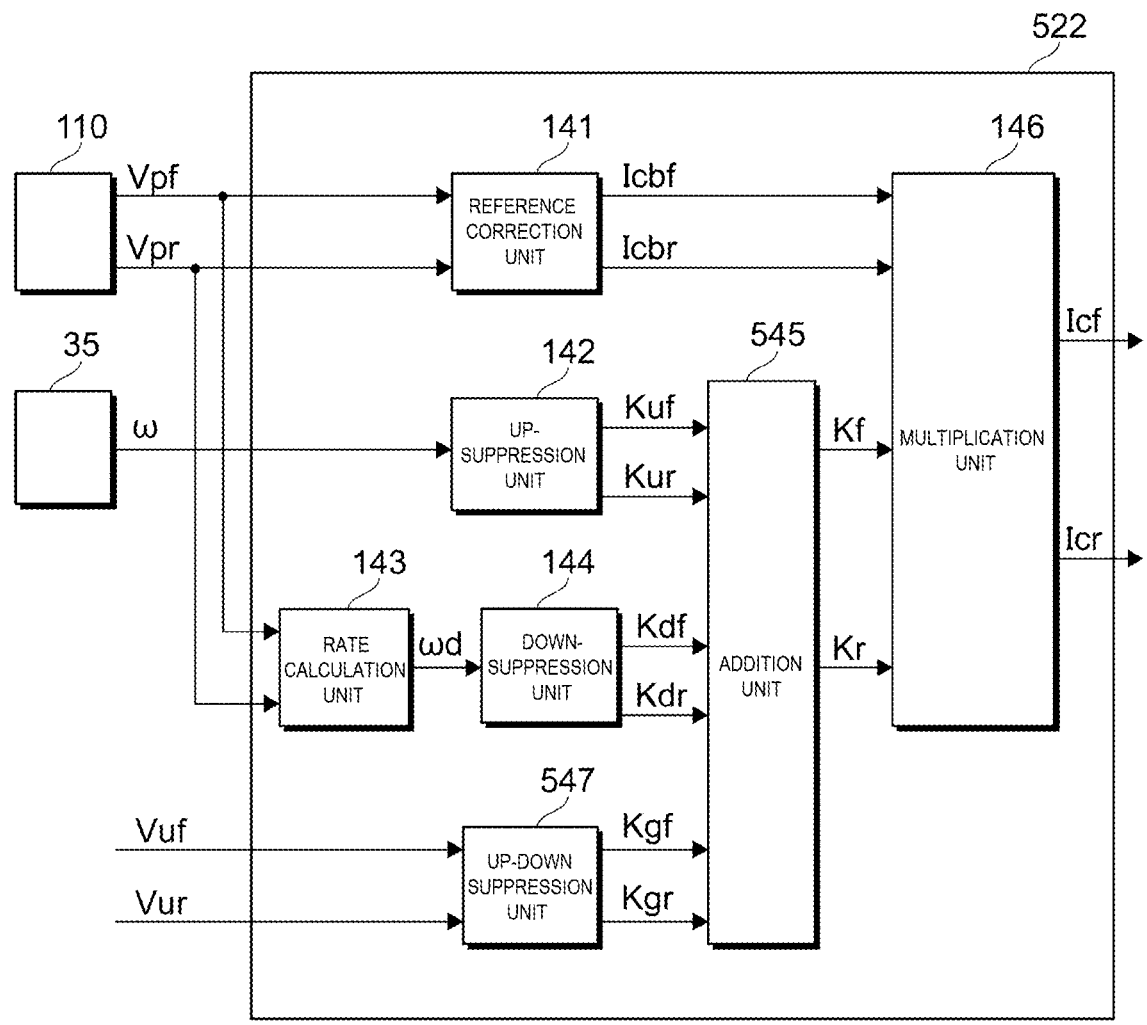
FIG. 11 is a schematic configuration diagram of a correction unit 522 of a motorcycle 500 according to a third embodiment.

FIG. 11 is a schematic configuration diagram of a correction unit 522 of a motorcycle 500 according to a third embodiment.

The motorcycle 500 according to the third embodiment differs from the motorcycle 1 according to the first embodiment in the correction unit 522 equivalent to the correction unit 122. The correction unit 522 differs from the correction unit 122 in being provided with an up-down suppression unit 547 that suppresses vibration in an up-down direction of the vehicle body 10, and in a method of calculating the composite coefficients Kf and Kr by an addition unit 545 equivalent to the addition unit 145. Hereinafter, differences from the motorcycle 1 will be described. Objects having the same function are denoted by the same reference sign in the motorcycle 1 and the motorcycle 500, and a detailed description thereof will be omitted.

The up-down suppression unit 547 sets up-down coefficients Kgf and Kgr for correcting the reference correction currents Icbf and Icbr in order to suppress vibration in the up-down direction of the vehicle body 10 based on known skyhook theory. A method of setting the up-down coefficient Kgf will be described below. Since a method of setting the up-down coefficient Kgr is the same as the method of setting the up-down coefficient Kgf, a description thereof will be omitted.

When the vertical velocity Vuf, and a relative velocity (Vuf−Vdf) between the vertical velocity Vuf and the vertical velocity Vdf are in the same direction, the up-down suppression unit 547 sets the up-down coefficient Kgf to a positive value. On the other hand, when the vertical velocity Vuf, and the relative velocity (Vuf−Vdf) between the vertical velocity Vuf and the vertical velocity Vdf are opposite to each other in direction, the up-down suppression unit 547 sets the up-down coefficient Kgf to a negative value.

It can be exemplified that the vertical velocities Vuf and Vur are obtained by integrating acceleration in the up-down direction, which is detected by an acceleration sensor provided in the motorcycle 500. The vertical velocities Vdf and Vdr may be calculated by using the up rate (nu detected by the pitch rate sensor 35, a distance in the front-rear direction between the up rate sensor 35 and a rotation center of front wheel 2, and a distance in the front-rear direction between the pitch rate sensor 35 and a rotation center of the rear wheel 3.

The addition unit 545 calculates the composite coefficient Kf by adding the up-down coefficient Kgf, the up coefficient Kuf, and the down coefficient Kdf (Kf=Kgf+Kuf+Kdf). Further, the addition unit 545 calculates the composite coefficient Kr by adding the up-down coefficient Kgr, the up coefficient Kur, and the down coefficient Kdr (Kr=Kgr+Kur+Kdr).

According to the motorcycle 500 of the third embodiment, in addition to the operations of the motorcycle 1 according to the first embodiment, it is possible to suppress vibration in the up-down direction occurring in cases such as one where the motorcycle 500 travels on a road surface having unevenness.

The up-down suppression unit 547 may be added to the correction unit 422 of the motorcycle 400 according to the second embodiment, the composite coefficients Kf may be calculated by adding the up-down coefficient Kgf and the down coefficient Kdf, and the composite coefficient Kr may be calculated by adding the up-down coefficient Kgr and the down coefficient Kdr (Kf=Kgf+Kdf, Kr=Kgr+Kdr).

Accordingly, in addition to the operations of the motorcycle 400 according to the second embodiment, it is possible to suppress vibration in the up-down direction.

What is claimed is:
1. A control device comprising:
a processor configured to control a damping force of a damping device, which damps a force generated between a vehicle body of a two-wheeled vehicle and at least one of a front wheel and a rear wheel, said damping force being calculated based on;
a first angular velocity that is an angular velocity of rotational movement in a front-rear direction of the vehicle body, the first angular velocity being generated due to a difference between a velocity in an up-down direction on a front wheel side of the vehicle body and a velocity in the up-down direction on a rear wheel side of the vehicle body, and
a second angular velocity that is an angular velocity of rotational movement in the front-rear direction of an unsprung part having the front wheel and the rear wheel, the second angular velocity being generated due to a difference between a velocity in the up-down direction of the front wheel and a velocity in the up-down direction of the rear wheel wherein
the processor is configured to control the damping force of the damping device so as to suppress the rotational movement of the vehicle body in a direction of the first angular velocity in a first state where the direction of the first angular velocity and a direction of the second angular velocity are the same, and to make a suppression amount in the direction of the first angular velocity become smaller than a suppression amount of the first state in a second state where the direction of the first angular velocity and the direction of the second angular velocity are different.
2. The control device according to claim 1, wherein the processor is configured to:
set a reference current serving as a reference in determining a target current to be supplied to a control valve, the control valve being provided in the damp- ing device and being configured to increase the damping force as a current amount supplied is increased;
set a correction current for correcting the reference current; and
set the target current by adding the reference current and the correction current,
the processor calculates the correction current by multiplying a reference correction current serving as a reference in determining the correction current by a composite coefficient obtained by adding a first coefficient corresponding to the first angular velocity and a second coefficient corresponding to the second angular velocity, and
signs of the first coefficient and the second coefficient are the same in the first state, and signs of the first coefficient and the second coefficient are different in the second state.

3. The control device according to claim 2,
wherein in the second state, the first angular velocity has a direction in which the rotational movement occurs such that the front wheel side of the vehicle body sinks and the rear wheel side of the vehicle body rises, and when the first coefficient has a sign to make the front wheel side less likely to sink, the second coefficient has a sign to make the front wheel side likely to sink.

4. The control device according to claim 3, wherein
the processor is configured to control the damping force of the damping device by further using a velocity in the up-down direction of the vehicle body.

5. A suspension system, comprising:
the control device according to claim 3; and
a suspension whose damping force is controlled by the control device.

6. The control device according to claim 2,
wherein in the first state, the first angular velocity has a direction in which the rotational movement occurs such that the front wheel side of the vehicle body sinks and the rear wheel side of the vehicle body rises, and when the first coefficient has a sign to make the front wheel side less likely to sink, the second coefficient has a sign to make the front wheel side less likely to sink.

7. The control device according to claim 6, wherein
the processor is configured to control the damping force of the damping device by further using a velocity in the up-down direction of the vehicle body.

8. A suspension system, comprising:
the control device according to claim 6; and
a suspension whose damping force is controlled by the control device.

9. The control device according to claim 2, wherein
the processor is configured to control the damping force of the damping device by further using a velocity in the up-down direction of the vehicle body.

10. A suspension system, comprising:
the control device according to claim 2; and
a suspension whose damping force is controlled by the control device.

11. The control device according to claim 1, wherein
the processor is configured to control the damping force of the damping device by further using a velocity in the up-down direction of the vehicle body.

12. A suspension system, comprising:
the control device according to claim 11; and
a suspension whose damping force is controlled by the control device.

13. The control device according to claim 1, wherein
the processor is configured to control the damping force of the damping device by further using a velocity in the up-down direction of the vehicle body.

14. A suspension system, comprising:
the control device according to claim 1; and
a suspension whose damping force is controlled by the control device.

* * * * *